United States Patent Office 3,059,150
Patented Oct. 16, 1962

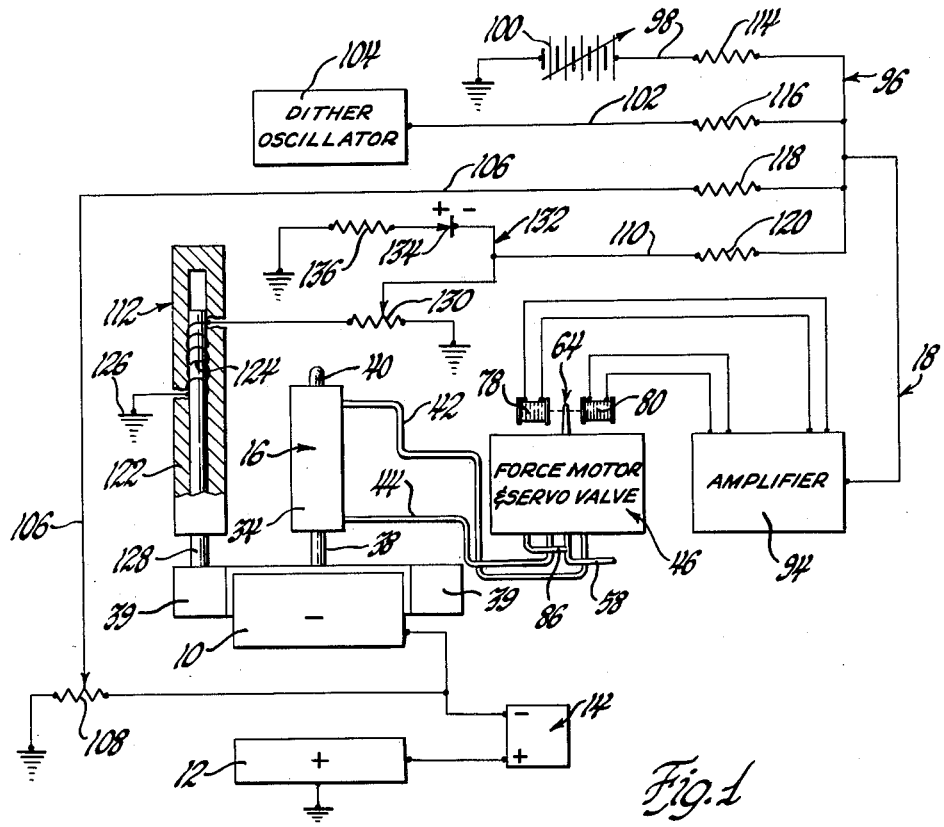

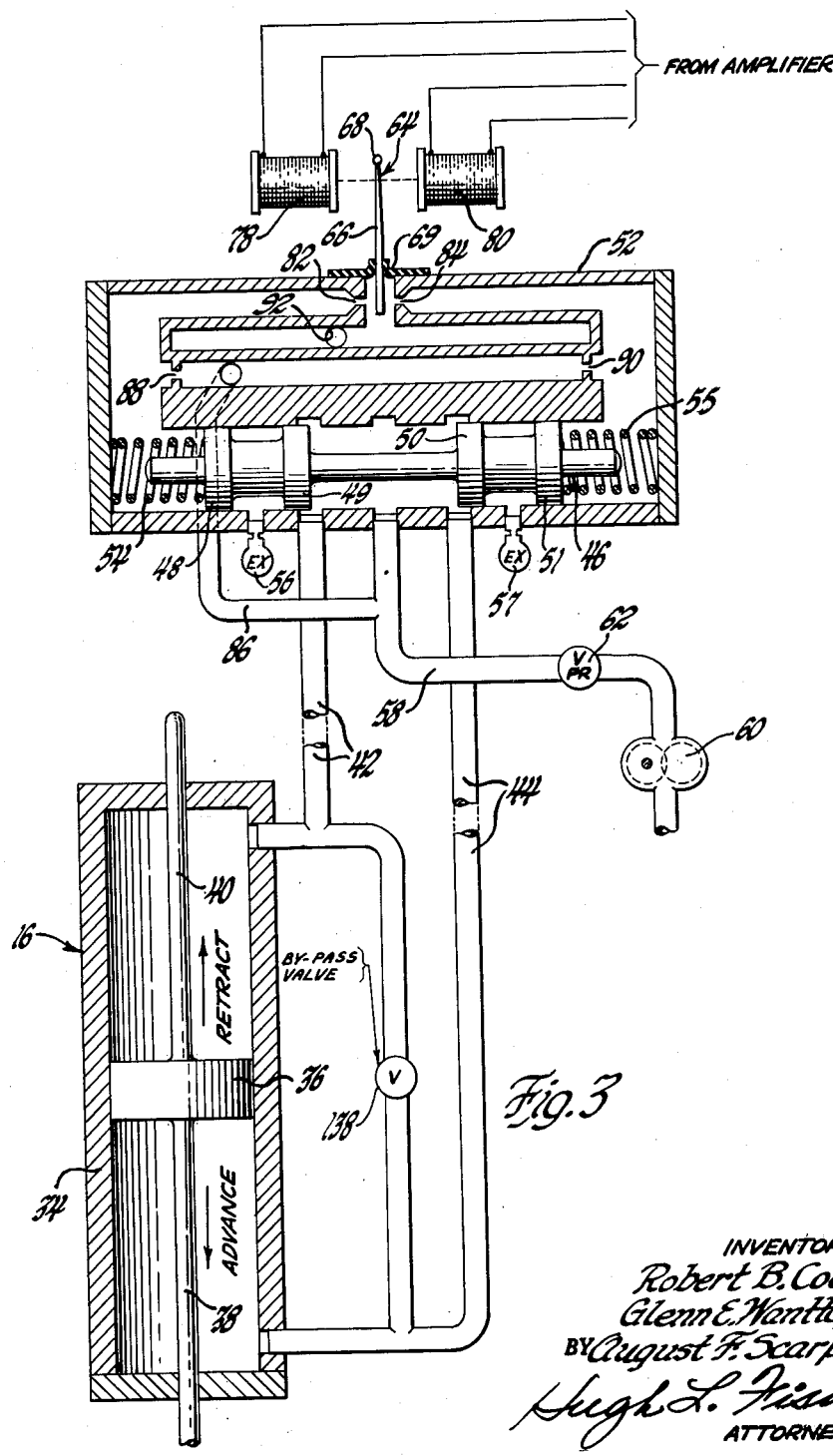

3,059,150
ELECTRIC DISCHARGE MACHINING
APPARATUS
Robert B. Colten, Oak Park, August F. Scarpelli, Warren, and Glenn E. Wanttaja, Rochester, Mich., assignors to General Motors Corporation, Detroit, Mich., a corporation of Delaware
Filed Aug. 7, 1959, Ser. No. 832,345
27 Claims. (Cl. 315—357)

This invention relates generally to electric discharge machining apparatus, and specifically to power feed and power supply systems therefor.

The process of electric discharge machining, also known as "arc" or "spark" machining, produces a metal machining action through the agency of a series of intermittent electric discharges occurring across a predetermined gap between a negative electrode and a positive workpiece. These discharges occur in the presence of a dielectric fluid and cause metal removal from the workpiece at a rate determined by the number of discharges occurring within a selected interval, as well as other factors. To adapt this type machining for mass production in accordance with generally accepted techniques, it is necessary that the machining operation take place automatically with a minimum of attention from an operator. So that a minimum of cutting time is lost during retraction and advance of the electrode, there should be no lost motion from gear backlash or windup from accelerating and decelerating an electric motor. Also, such apparatus must be durable, uncomplicated, and easily maintained.

Accordingly, it is proposed by the invention to provide a novel power feed system that automatically maintains a predetermined gap between the electrode and the workpiece; that automatically operates quickly, smoothly, and continuously so as to provide full-time machining; that is uncomplicated; and that may be easily installed and serviced at a minimum cost.

A related and more specific objective of the invention is to afford an electro-hydraulic system in which an electric summing network develops an operating signal for controlling a fluid pressure actuated feed mechanism from a plurality of signals. These signals provide information concerning variations in the actual gap between the electrode and the workpiece from a reference gap, indicate the velocity of movement of the electrode relative to the workpiece, and with this information cause the electrode to be maneuvered according to a predetermined scheme and cause selected components of the system to be vibrated continuously so as to be instantly responsive and also so as to keep the gap clear of any short circuit producing material during operation.

During operation it is possible for short circuits to occur between the electrode and the workpiece whenever, for example, the material removed from the workpiece and other foreign material are allowed to build up sufficiently between the electrode and the workpiece. When these short circuits occur, the gap voltage is considerably reduced so that the machining action slows or stops. As a result, machining time is lost in clearing the short since the electrode must be withdrawn or retracted, and then, once the gap voltage has recovered, the electrode may be advanced back to the machining position.

It is therefore contemplated by the invention to provide the foregoing system with an oscillating signal that causes the electrode to be continuously vibrated. This produces a pumping action such that the dielectric fluid in the gap will flush away any material that could produce the undesired short circuit. Also, this oscillating signal continuously vibrates the moving components so that the system is instantly responsive to error signal information supplied thereto.

When the electrode is being advanced towards the workpiece, it is possible if the feed rate is too great for the electrode to overshoot and actually touch the workpiece and generate the undesired short circuit. The production of a short circuit in this manner is of course an extreme case, however, any amount of overshooting is undesirable since then the feed mechanism must compensate therefor and a "hunting" effect generally will take place while the electrode is being positioned at the proper distance from one workpiece. On the other hand, retraction should be preferably accomplished quickly when required, for the intervals required to retract and advance the electrode are actually lost machining time.

Accordingly, the system in a unique way affords relatively fast electrode retraction and relatively slow electrode advance so as to obtain optimum machining rates. Specifically, a velocity transducer produces a feedback signal of a polarity determined by whether the electrode is being advanced or retracted, and this signal when of a selected polarity is limited so that in turn electrode advance and retraction occurs at different velocity rates.

The foregoing and other objects and advantages of the invention will be apparent from the following description and from the accompanying drawings in which:

FIGURE 1 is a diagrammatic illustration of electric discharge machining apparatus incorporating the principles of the invention;

FIGURE 2 is a circuit diagram of the power supply for the apparatus; and

FIGURE 3 illustrates a fluid pressure operated feed system for the apparatus.

Referring to the drawings in detail, the numerals 10 and 12 denote respectively an electrode and a workpiece, both of which are in the presence of a suitable dielectric fluid. This can be accomplished by stationing in a known manner a tank or the equivalent (not shown) on the machine base (not shown). The workpiece 12 may be appropriately releaseably affixed to the tank and immersed in the fluid at a chosen distance from the electrode 10, such distance requiring that the electrode 10 also be partially immersed. The electrode 10 and the workpiece 12 are respectively connected to the negative and positive terminals of a power supply depicted generally at 14, which will be explained more in detail later. The space or gap between the electrode 10 and the workpiece 12 is controlled by a power feed mechanism such as the fluid pressure actuated feed servo 16 in turn operated by a control system denoted generally at 18. As will become apparent, the feed servo 16 maintains a predetermined gap between the electrode 10 and the workpiece 12 by advancing and retracting the electrode 10 as required by the machining operation. The power supply 14 produces intermittent electrical discharges across the gap, and these discharges erode or dislodge particles from the workpiece according to some desired scheme.

The power supply 14 is preferably of the RC type illustrated in FIGURE 2 and has a charging circuit 20 in which a variable capacitor 22, a variable resistance 24, and a source of direct current such as battery 26, are arranged in series with inductances, e.g., choke coils 28 and 30. The power supply 14 also has a discharging circuit 32 comprising the capacitor 22, which is in series with the electrode 10 and the workpiece 12. As mentioned, the electrode 10 is connected to the negative terminal of the battery 26 and the workpiece 12 is joined to the positive terminal.

The parameters of the circuits 20 and 32 and the gap between the electrode 10 and the workpiece 12 are so selected that when the voltage across the capacitor 22 is high enough to break down the dielectric fluid in the gap, an electric discharge will occur along an ionized or conductive path between the electrode 10 and the workpiece 12. After a discharge the voltage across the gap reduces preferably to a value low enough for de-ionization of the gap to occur. This de-ionization is important for if it does not happen promptly, it is possible for additional discharges to occur. To explain further, after a discharge there is a tendency for discharge current to oscillate and produce more gap discharges. Although these oscillations are rapidly attenuated, unless the gap is de-ionized immediately, it is possible for source current to flow directly into the gap. Therefore, to obtain quick de-ionization, the charging circuit 20 is provided with inductive reactance, which functions to retard current flow. Therefore, more electric discharges per time interval are possible when both inductance and resistance are added to the charging circuit. This is true because in general the rate at which electric discharges may be produced is a function of the capacitor charging time and of the de-ionization time of the dielectric fluid.

The feed servo 16, illustrated in detail in FIGURE 3, is fluid pressure actuated so as to obtain fast responsiveness, i.e., there is no lost motion occurring upon initiation or reversal of movement. For example, with a gear drive, a backlash would result and increase with wear, and with an electric motor there is undesired windup when accelerating and decelerating. Link-lever and screw feed mechanisms also have this fault. As depicted, the servo 16 includes a cylindrical housing 34 in which a piston 36 is slidably disposed. The piston 36 has extending from the housing 34 a piston rod 38 that attaches to a carrier 39. The carrier 39 has in turn secured thereto the electrode 10. On the opposite side of the piston 36 from the piston rod 38 is a guide rod 40 also extending from the housing 34. Rod 40 serves as a guiding support for the piston 36 in a known manner. Suitable seals may be furnished between the rods 38 and 40 and the ends of the housing 34.

The servo 16 is demonstrated as being pressure suspended, i.e., during operation pressure acting on opposite sides of the piston 36 is so correlated as to maintain the piston 36 in a predetermined position corresponding to the desired gap. It is possible if desired, to utilize other means such as spring bias versus pressure to establish preferred positions.

The fluid pressure for actuating the servo 16 is supplied to opposite ends thereof by feed lines 42 and 44 under the control of a servo valve denoted generally at 46. The servo valve 46 may be of any known construction, e.g., that illustrated with spaced lands 48, 49, 50, and 51 formed thereon so as to be slidable in a bore in a valve housing 52. Opposing springs 54 and 55 keep the servo valve 46 in the illustrated center position in which the ports to both feed lines 42 and 44 are removed from communication with one or the other of the exhaust ports 56 and 57 and placed in communication with a port to a pressure supply line 58. The exhaust ports 56 and 57 are preferably slightly restricted to improve operational responsiveness. Pressure supply line 58 communicates with a suitable pump 60 and includes a pressure regulator valve 62 for maintaining the desired level of pressure in the supply line 58. The pump 60 may be driven in any desired manner.

Also, to be considered, is the gravity effect when the feed servo 16 is vertically arranged, and this can be compensated for in any known manner. For instance, the diameter of the piston rod 38 can be made smaller than the diameter of the guide rod 40 so that the effective area on the piston rod side of the piston 36 is greater than the area on the guide rod side; consequently, this differential in areas will result in a greater applied force on the piston rod side, which will be adequate to offset gravity forces. Another alternative is to always have a higher pressure supplied to the piston rod side of the piston 36.

With this feed servo arrangement, when the servo valve 46 is manipulated in either direction, the pressure supply to one of the feed lines 42 or 44 will be reduced or entirely cut off with the result that the side still being supplied pressure will dominate and the piston 36 will be moved by this dominating pressure. The side with the reduced or cut off pressure will be relieved through one of the exhaust ports 56 or 57 as will become apparent.

The production of variable pressures for maneuvering the servo valve 46 is accomplished by a force motor of any suitable construction such as the force motor 64 depicted. This motor 64 includes a reed valve 66 pivoted at 68 and arranged so as to enter the valve housing 52 as illustrated. The point of entry of the reed valve 66 may be sealed by a seal element 69 or may be left open if drainage is permitted to return to the sump. Energization of opposite relays 78 and 80 will cause the reed valve 66 to pivot about the axis at 68 and in so doing the end entering the valve housing 52 will restrict one or the other of control orifices 82 and 84 thereby altering the pressure of the fluid acting on the opposite ends of the servo valves 46. The supply of fluid pressure for this purpose is delivered by a branch 86 of the pressure supply line 58 through opposite supply orifices 88 and 90 to the end areas of the servo valve 46. If the reed valve 66 is in the viewed center position, this fluid pressure is relieved through an exhaust chamber 92. On the other hand, if the reed valve 66 abuts or partially restricts one of the control orifices, for example, control orifice 82, the pressure upstream thereof will build up and this pressure, when adequate, will move the servo valve 46 to the right, reducing or cutting off the supply of fluid pressure to the feed line 42 by establishing communication between the exhaust port 56 and the port to feed line 42 while increasing the supply of fluid pressure to feed line 44. This action will cause the piston 36 to be moved upwardly from the depicted FIGURE 3 position. The same events will occur in reverse if the reed valve 66 restricts the orifice 84, i.e., the servo valve 46 now will be moved to the left so that feed line 42 is supplied fluid pressure and feed line 42 is relieved via exhaust port 57 and the piston 36 will be urged downwardly, again as viewed in FIGURE 3.

The purpose of the supply orifices 88 and 90 is to create a pressure differential between the branch 86 and the chambers adjacent the servo valve 46. Without these orifices it can be seen that there could be no control because all of the fluid pressure delivered by the branch 86 would be relieved via exhaust 92 through either of the control orifices 82 and 84, or both.

The force motor 64 and servo valve 46 just described are for purposes of demonstrating the invention. It should be undestood that other types of each may be employed as will be understood by those versed in the art.

The relays 78 and 80 are energized by an amplifier operating signal voltage received from a suitable amplifier denoted generally at 94. The arrangement of the amplifier 94 is such that this operating signal voltage, produced by a summing circuit indicated generally at 96, will have a certain polarity as will be described and when amplified, will influence one or the other of the relays 78, 80. In addition to having the output thereof joined to the amplifier 94, the summing circuit 96 has plural inputs thereto, each furnished with a different signal voltage.

In some arrangements, the summed signal voltage from the summing circuit 96 may be adequate in strength to operate the force motor 64 directly. If this condition exists, the amplifier 94 may be eliminated from the control system 18.

The input denoted by the numeral 98 furnishes a gap reference signal voltage from a variable source 100. This gap reference signal voltage may be altered but is preferably adjusted to a value of some predetermined proportion to the voltage across the electrode 10 and the workpiece 12 occurring when optimum machining action is taking place.

An input 102 provides the summing network 96 with an oscillating signal voltage of a frequency, for example and without limitation, somewhere in the range of 10 to 500 cycles per second. This oscillating signal voltage is furnished by a suitable dither oscillator 104, and the purpose of the oscillating signal voltage is to vibrate continuously the force motor 64 and servo valve 46 as well as the feed servo piston 36 and accordingly the electrode 10. This renders the force motor 64 and servo valve 46 instantly responsive when position changes are desired and eliminates the influence of static friction. This is also true of the servo piston 36 but in addition by vibrating the electrode 10, the resultant pumping action of the dielectric fluid causes eroded material from the workpiece 12 and dirt or other foreign material within the gap to be flushed away, thus reducing the possibility of any short resulting from a buildup of this material within the gap.

The summing circuit input 106 extends to the discharge gap between the electrode 10 and the workpiece 12 and is connected to the negative terminal of the power supply 14 so as to have developed therein a voltage that corresponds to the actual gap voltage. This is referred to as a gap feedback signal voltage and as applied to the summing circuit 96 has a value determined by a gain potentiometer 108 installed in the input 106.

The other input to the summing circuit 96 is assigned the numeral 110 and furnishes a velocity feedback signal voltage produced by a velocity transducer 112. This velocity feedback signal voltage will be somewhat proportional to the speed at which the electrode 10 is retracted and advanced as will be explained.

Each of the inputs 100, 102, 106, and 110 are respectively provided with impedances 114, 116, 118, and 120. These impedances normally will be resistors unless for some reason the signal voltages are required by a particular installation to be modified in a different fashion.

The velocity transducer 112 may be of any suitable type, for instance, the form demonstrated, and comprises a housing 122 having installed therein a winding 124 grounded at 126 and so arranged as to coact with an armature 128 of permanently magnetized material attached for movement with the carrier 39. The winding 124 is connected to the input 110 through a gain potentiometer 130 and is so wound that upon retraction, or upward movement of the electrode 10, as viewed in FIGURE 1, a negative signal is produced, whereas upon advance or downward movement, a positive signal is generated and appears across the gain potentiometer 130.

It is necessary as will become more apparent, especially after considering the operational summary, to limit the amount of this velocity feedback signal voltage when the electrode 10 is being retracted and the signal is negative. This is because it is desirable for the electrode 10 to be retracted very rapidly when required in order to reduce lost machining time, and a large negative velocity feedback signal voltage would tend to reduce the rate of retraction. Therefore, a limiting circuit designated generally at 132 is incorporated in this system and includes a diode 134 and a grounded resistor 136. The anode and cathode of the diode 134 are so arranged that when the velocity feedback signal voltage is going negative, as during retracting movement of the electrode 10, the cathode of the diode 134 will become more negative until the diode 134 commences to conduct. When this happens, the additional current drawn will increase the voltage drop across the resistance portion of the gain potentiometer 130 between the winding 124 and the potentiometer 130 and thereby reduce or limit the voltage appearing across the resistor 120. If for some reason a larger velocity feedback signal voltage is desired of either polarity, a reference voltage may be applied across the resistor 136 and in a known manner will alter this velocity feedback signal voltage.

The operation of the system will be discussed by assuming three different conditions: namely, proper cutting, retraction or withdrawal of the electrode 10 for some reason, and subsequent advance or feed of the electrode 10 back to the machining position. Also, in considering the operation, it shoull be noted that numerous adjustments have been made possible by the use of gain potentiometers as well as by employing various voltage sources, resistors, and capacitors of the variable or adjustable kind. These adjustments render the system more versatile by permitting numerous materials to be machined at different cutting rates and also facilitates the use of other type power supplies.

Proper cutting action, which will be considered first, assumes that the electrode 10 and the workpiece 12 are so positioned as to afford an optimum machining gap. This indicates that the gap reference signal voltage and the gap feedback signal voltage are in the desired proportion and that the resultant operating voltage from the summing circuit 96 will not alter the status of the force motor 64. Moreover, this presumes that the electrode 10 is being advanced at the proper rate, that the velocity feedback signal voltage is also proper, i.e., slightly positive in the example of the velocity transducer described, and that the oscillating signal voltage is producing the desired amount of vibration.

For understanding this phase of the operation more clearly, actual voltage values have been selected but it is to be understood that these are only for exemplary purposes. With the proper cutting action taking place, the actual gap voltage will be assumed to be a minus 40 volts. Further, it will be assumed that the gain potentiometer 108 is adjusted to drop this −40 volts to −20 volts. Therefore, to obtain a balance in the summing circuit 96, the gap reference signal voltage from the variable source 100 will be set at a +20 volts. As then can be seen, these two voltages will balance or offset each other, and there will be no effect on the operating voltage appearing at the output of the summing circuit 96.

To maintain this balance, it will be necessary for the electrode 10 to be continuously advanced at the proper speed; otherwise, as the metal is removed, the gap will increase and accordingly the actual gap voltage will become more negative. If the gap voltage does become more negative than −20 volts, a negative operating voltage will be supplied to the amplifier 94 by the summing circuit 96. This operating voltage will in turn energize relay 80 and cause the reed valve 66 to restrict control orifice 84. The servo valve 46 will be forced to the left so that the pressure delivered via feedline 42 will urge the piston 36 is the electrode advancing direction while the pressure in feedline 44 is relieved through exhaust port 57, thus closing the gap. In advancing in this direction a positive velocity feelback signal voltage, which as explained is not limited, is developed and will tend to slightly offset the negative voltage resulting from comparing the gap reference signal voltage with the gap feedback signal voltage. Consequently, the advance of the electrode 10 by the feed servo 16 will be retarded.

It will next be assumed that for some reason a short occurs across the gap between the electrode 10 and the workpiece 12. This, as has been mentioned, may be due to overshooting, i.e., the electrode 10 may have been advanced past the desired point and too close to the workpiece 12, or eroded material and dirt may have built up within the gap. When the short happens, the actual gap voltage will approximate zero, or perhaps may become −10 volts. The voltage now appearing across the gain potentiometer 108 will be halved and with the values selected a substantial unbalance will result between this gap feedback signal voltage and the gap reference signal voltage such that the operating voltage, the sum of the two, will become a large positive value. A large positive operating voltage will energize the force motor relay 78 and cause the reed valve 66 to restrict orifice 82. The resultant pressure build-up will move the servo valve 46 so that the pressure delivered by feed line 44 becomes effective (feed line 42 is relieved through exhaust port 56) and the servo piston 36 is moved in the retracting or gap opening direction.

As can be seen, this positive operating voltage, if there is no interefrence from the velocity feedback signal voltage, i.e., no offsetting thereby, will produce a rapid retraction, which, of course, is desirable because the short should be cleared as soon as possible in order to reduce the loss in machining time. By utilizing the limiting circuit 132 to limit the negative velocity feedback voltage, the operating voltage is not made less positive thereby, and hence rapid retraction is possible.

When the electrode 10 has been retracted far enough for the short to clear and to a point where, e.g., a —65 volts appears across the open gap, the gap feedback signal voltage applied to the gain potentiometer 108 will become approximately a —32 volts. This voltage when compared to the gap reference signal voltage will result in a negative operating voltage and accordingly the force motor relay 80 will now be energized and the servo valve 46 caused to supply fluid pressure to the servo motor 16 such that the piston 36 is again advanced. The advance is desired to be relatively slow so as to not overshoot for the reasons previously indicated. For this reason, the negative operating voltage should be reduced, and this is accomplished by the positive velocity feedback signal voltage produced by the velocity transducer 112 and applied to the gain potentiometer 130. Since the velocity feedback signal voltage is positive, the diode 134 is open and the limiting circuit 132 will not influence the velocity feedback signal voltage. Again selecting arbitrary values, this amount may be, say +8 volts and will alter the negative operating voltage so as to cause a voltage of a less negative value to be delivered to the output of the summing circuit 96 thereby dampening or slowing up the advance of the electrode.

Although the responsiveness of the feed servo 16 may be altered by changing the gain of the amplifier 94, thereby increasing or decreasing the strength of the signals supplied to the force motor 64, it may be preferable to do this by calibrating the pressure system; in other words, afford the system with a hydraulic gain. To do this, an adjustable bypass valve 138 of suitable construction may be installed between lines 42 and 44. By changing the settings of the bypass valve 138 the quantity of pressure fluid circulated can be varied, and accordingly the response of the feed servo 16. To explain further, if a substantial part of the pressure fluid supplied for moving the piston 36 in one direction is bypassed, then the piston movement will be slow, or if none of the pressure fluid is bypassed, the piston movement will be rapid.

If desired, instead of having the electrode 10 advanced and retracted relative to the workpiece 12, the apparatus may be altered so that the workpiece 12 may be maneuvered relative to the electrode 10. This change only requires that the control system 18 and servo 16 be applied to the workpiece 12 in the same way as described relative to the electrode 10. Additionally, the servo 16 may be replaced by any suitable fluid actuated motor (not shown) of a character that through an appropriate drive mechanism, e.g., a screw, will properly advance and retract either the electrode 10 or the workpiece 12. The force potor 64 and the servo valve 46 may still be employed to supply pressure fluid to the fluid actuated motor so as to effect the desired rotation thereof at the selected speed.

From the foregoing it can be seen that the system affords a very responsive fluid pressure actuated servo that reduces substantially lost machining time. With the system the velocity feedback signal voltage dampens electrode movement in a selected direction, the actual gap voltage when compared with a reference voltage maintains the optimum gap spacing for most efficient machining, and the oscillating signal voltage keeps the force motor 64 and servo motor valve 46 free while producing the desired pumping action for continuously clearing the gap. All of these various signal voltages are summed electrically and afford an efficient and responsive automatic operation.

The invention is to be limited only by the following claims:

1. In electric discharge machining apparatus for removing material from an electrically conductive workpiece, the combination of an electrode, means causing intermittent electric discharges across a gap between the electrode and the workpiece, power means varying the relative positions of the electrode and the workpiece, and control means for the power means including gap voltage sensing means developing a gap signal voltage corresponding to the relative positions of the electrode and the workpiece, velocity sensing means developing a velocity signal voltage corresponding both to the velocity at which and to the direction in which the power means varies the relative positions of the electrode and the workpiece, and means altering the velocity signal voltage in one direction of relative movement between the electrode and the workpiece, the control means being so arranged as to correlate the signal voltages from the gap voltage and velocity sensing means and cause the power means both to adjust the relative positions of the electrode and the workpiece so as to maintain a predetermined gap voltage therebetween and to alter the relative positions of the electrode and the workpiece at fast and slow velocity rates in accordance with the variations in the velocity signal voltage as determined by whether the electrode and the workpiece are respectively being separated or brought closer together.

2. In electric discharge machining apparatus for removing material from an electrically conductive workpiece, the combination of an electrode, means causing intermittent electric discharges across a gap between the electrode and the workpiece, power means varying the relative positions of the electrode and the workpiece, and control means for the power means including gap voltage sensing means developing a gap signal voltage corresponding to the relative positions of the electrode and the workpiece, velocity sensing means developing a velocity signal voltage corresponding both to the velocity at which and to the direction in which the power means varies the relative positions of the electrode and the workpiece, and means altering the velocity signal voltage in one direction of movement between the electrode and the workpiece, the control means being so arranged as to correlate the signal voltages from the gap voltage and velocity sensing means and cause the power means both to adjust the relative positions of the electrode and the workpiece so as to maintain a predetermined gap voltage therebetween and to alter the relative positions of the electrode and the workpiece at fast and slow velocity rates in accordance with the variations in the velocity signal voltage when the electrode and the workpiece are respectively being separated or brought closer together.

3. In electric discharge machining apparatus for removing material from an electrically conductive workpiece, the combination of an electrode, means causing intermittent electric discharges across a gap between the electrode and the workpiece, power means varying the relative positions of the electrode and the workpiece, control means for the power means including gap voltage sensing means developing a gap signal voltage corresponding to the relative positions of the electrode and the workpiece, velocity sensing means developing a velocity signal voltage corresponding both to the velocity at which and to the direction in which the power means varies the relative positions of the electrode and the workpiece, and means altering the velocity signal voltage in one direction of relative movement between the electrode and workpiece the control means being so arranged as to correlate the signal voltages from the gap voltage and velocity sensing means and cause the power means both to adjust the relative positions of the electrode and the workpiece so as to maintain a predetermined gap voltage therebetween and to alter the relative positions of the electrode and the workpiece at fast and slow velocity rates in accordance with the variations in the velocity signal voltage as determined by whether the electrode and the workpiece are respectively being separated or brought closer together, and means continuously vibrating the power means.

4. In electric discharge machining apparatus for removing material from an electrically conductive workpiece, the combination of an electrode, means causing intermittent electric discharges across a gap between the electrode and the workpiece, power means varying the relative positions of the electrode and the workpiece, and control means for the power means including gap voltage sensing means developing a gap signal voltage corresponding to the relative positions of the electrode and the workpiece, velocity sensing means developing a velocity signal voltage corresponding both to the velocity at which and to the direction in which the power means varies the relative positions of the electrode and the workpiece, and means altering the velocity signal voltage in one direction of relative movement between the electrode and workpiece, and oscillating means producing a vibrating signal voltage, the control means being so arranged as to correlate the signal voltages and in accordance therewith cause the power means to have continuously vibrating movement while adjusting the relative positions of the electrode and the workpiece so as to maintain a predetermined gap voltage therebetween and also cause the power means to alter the relative positions of the electrode and the workpiece at fast and slow velocity rates in accordance with the variations in the velocity signal voltage as determined by whether the electrode and the workpiece are respectively being separated or brought closer together.

5. In electric discharge machining apparatus for removing material from an electrically conductive workpiece, the combination of an electrode, means causing intermittent electric discharges across a gap between the electrode and the workpiece, power means varying the relative positions of the electrode and the workpiece, and control means for the power means including gap voltage sensing means developing a gap signal voltage corresponding to the relative positions of the electrode and the workpiece, a source of voltage providing a gap reference signal voltage corresponding in magnitude to the voltage across a predetermined gap between the electrode and the workpiece, velocity sensing means developing a velocity signal voltage corresponding both to the velocity at which and to the direction in which the power means varies the relative positions of the electrode and the workpiece, and means altering the velocity signal voltage in one direction of relative movement between the electrode and workpiece, the control means being so arranged as to correlate the signal voltages and cause the power means both to adjust the relative positions of the electrodes and the workpiece so that the gap signal voltage corresponds to the gap reference signal voltage thereby maintaining the predetermined gap and to alter the relative positions of the electrodes and the workpiece at fast and slow velocity rates in accordance with the variations in the velocity signal voltage as determined by whether the electrode and the workpiece are being respectively separated or brought closer together.

6. In electric discharge machining apparatus for removing material from an electrically conductive workpiece, the combination of an electrode; means causing intermittent electric discharges across a gap between the electrode and the workpiece; fluid pressure operated means varying the relative positions of the electrode and the workpiece; and control means for the fluid pressure operated means including fluid control means controlling the fluid pressure operated means, plural sources of signal voltages so arranged as to produce a gap reference signal voltage corresponding in magnitude to the voltage across a predetermined gap between the electrode and the workpiece and a gap signal voltage corresponding to the true voltage appearing across the gap and accordingly to the relative positions of the electrode and the workpiece, and circuit means communicating with each of the signal voltage sources and adapted to develop an operating voltage corresponding to the variations between the gap reference and gap signal voltages, the operating voltage being utilized by the fluid control means to control the operation of the fluid pressure operated means so that the fluid pressure operated means is caused to adjust the relative positions of the workpiece and the electrode thereby maintaining the predetermined gap therebetween.

7. In electric discharge machining apparatus for removing material from an electrically conductive workpiece, the combination of an electrode; means causing intermittent electric discharges across a gap between the electrode and the workpiece; fluid pressure operated means varying the relative positions of the electrode and the workpiece; and control means for the fluid pressure operated means including fluid control means controlling the fluid pressure operated means, plural sources of signal voltages so arranged as to produce a velocity signal voltage corresponding both to the velocity at which and to the direction in which the fluid pressure operated means varies the relative positions of the electrode and the workpiece, a gap reference signal voltage corresponding in magnitude to the voltage across a predetermined gap between the electrode and the workpiece, and a gap signal voltage corresponding to the relative positions of the electrode and the workpiece, circuit means communicating with each of the signal voltage sources and adapted to develop an operating voltage representative of the combined signal voltages, the operating voltage being utilized by the fluid control means to control the operation of the fluid pressure operated means so that the fluid pressure operated means is caused to adjust the relative positions of the workpiece and the electrode thereby maintaining the predetermined gap therebetween, and means altering the velocity signal voltage in one direction of relative movement between the electrode and the workpiece so that the fluid pressure operated means alters the relative positions of the electrode and the workpiece at fast and slow velocity rates in accordance with the variations in the velocity signal voltage as determined by whether the electrode and the workpiece are respectively being separated or brought closer together.

8. In electric discharge machining apparatus for removing material from an electrically conductive workpiece, the combination of an electrode; means causing intermittent electric discharges across a gap between the electrode and the workpiece; power operated means varying the relative positions of the electrode and the workpiece; and control means for the power operated means including plural sources of signal voltages producing a velocity signal voltage corresponding both to the velocity at which and to the direction in which the power operated means varies the relative positions of the electrode and the workpiece, a gap reference signal voltage corresponding in magnitude to the voltage across a predetermined gap between the electrode and the workpiece, a gap signal voltage corresponding to the relative positions of the electrode and the workpiece, and an oscillating signal voltage, circuit means communicating with each of the signal voltage sources and adapted to develop an operating voltage representative of the combined signal voltages, the operating voltage being utilized by the control means to control the operation of the power operated means so that the power operated means is caused by the oscillating signal voltage to vibrate continuously while adjusting the relative positions of the workpiece and the electrode thereby maintaining the predetermined gap therebetween, and means altering the velocity signal voltage in one direction of relative movement between the electrode and the workpiece so that power operated means alters the relative positions of the electrode and the workpiece at fast and slow velocity rates in accordance with the variations in the velocity signal voltage as determined by whether the electrode and the workpiece are respectively being separated or brought closer together.

9. In electric discharge machining apparatus for removing material from an electrically conductive workpiece, the combination of an electrode; means causing intermittent electric discharges across a gap between the electrode and the workpiece; fluid pressure operated means varying the relative positions of the electrode and the workpiece; and control means for the fluid pressure operated means including fluid control means controlling the fluid pressure operated means, plural sources of signal voltages producing a velocity signal voltage corresponding both to the velocity at which and to the direction in which the fluid pressure operated means varies the relative positions of the electrode and the workpiece, a gap reference signal voltage corresponding in magnitude to the voltage across a predetermined gap between the electrode and the workpiece, a gap signal voltage corresponding to the relative positions of the electrode and the workpiece, and an oscillating signal voltage, circuit means communicating with each of the signal voltage sources and adapted to develop an operating voltage representative of the combined signal voltages, the operating voltage being utilized by the fluid control means to control the operation of the fluid pressure operated means so that the fluid pressure operated means is caused by the oscillating signal voltage to vibrate continuously while adjusting the relative positions of the workpiece and the electrode thereby maintaining the predetermined gap therebetween, and means altering the velocity signal voltage in one direction of relative movement between the electrode and the workpiece so that the fluid pressure operated means alters the relative positions of the electrode and the workpiece at fast and slow velocity rates in accordance with the variations in the velocity signal voltage as determined by whether the electrode and the workpiece are respectively being separated or brought closer together.

10. In electric discharge machining apparatus for removing material from an electrically conductive workpiece, the combination of an electrode; means causing intermittent electric discharges across a gap between the electrode and the workpiece; fluid pressure operated means varying the relative positions of the electrode and the workpiece; and control means for the fluid pressure operated means including fluid control means controlling the fluid pressure operated means, plural sources of signal voltages so arranged as to produce a velocity signal voltage corresponding to the velocity at which the fluid pressure operated means varies the relative positions of the workpiece and the electrode and of a magnitude determined by whether the workpiece and the electrode are being advanced or retracted relative to each other, a gap reference signal voltage corresponding in magnitude to the voltage across a predetermined gap between the electrode and the workpiece, and a gap signal voltage corresponding to the relative positions of the electrode and workpiece, circuit means communicating with each of the signal voltage sources and adapted to develop an operating voltage representative of the combined signal voltages, the operating voltages being utilized by the fluid control means to control the operation of the fluid pressure operated means so that the fluid pressure operated means is caused to adjust the relative positions of the workpiece and the electrode thereby maintaining a predetermined gap therebetween, and means altering the velocity signal voltage in one direction of relative movement between the electrode and workpiece so that fluid pressure operated means alters the relative positions of the electrode and the workpiece at fast and slow velocity rates in accordance with the variations in the velocity signal voltage when the electrode and the workpiece are respectively being retracted and advanced.

11. In electric discharge machining apparatus for removing material from an electrically conductive workpiece, the combination of an electrode; means causing intermittent electric discharges across a gap between the electrode and the workpiece; power operated means varying the relative positions of the electrode and the workpiece; and control means for the power operated means including plural sources of signal voltages so arranged as to produce a velocity signal voltage corresponding to the velocity at which the power operated means varies the relative positions of the workpiece and the electrode and of a magnitude determined by whether the workpiece and the electrode are being advanced or retracted relative to each other, a gap reference signal voltage corresponding in magnitude to the voltage across a predetermined gap between the electrode and the workpiece, a gap signal voltage corresponding to the relative positions of the electrode and the workpiece, and an oscillating signal voltage, circuit means communicating with each of the signal voltage sources and adapted to develop an operating voltage representative of the combined signal voltages, the operating voltage being utilized by the control means to control the operation of the fluid pressure operated means so that the power operated means is caused by the oscillating signal voltage to vibrate continuously while adjusting the relative positions of the workpiece and the electrode so as to maintain the predetermined gap therebetween, and means altering the velocity signal voltage in the direction of relative movement between the electrode and the workpiece so that the power operated means alters the relative positions of the electrode and the workpiece at fast and slow velocity rates in accordance with the variations in the velocity signal voltage when the electrode and the workpiece are respectively being retracted and advanced.

12. In electric discharge machining apparatus for removing material from an electrically conductive workpiece, the combination of an electrode; means causing intermittent electric discharges across a gap between the electrode and the workpiece; fluid pressure operated means varying the relative positions of the electrode and the workpiece; and control means for the fluid pressure operated means including fluid control means controlling the fluid pressure operated means, plural sources of signal voltages so arranged as to produce a velocity signal voltage corresponding to the velocity at which the fluid pressure operated means varies the relative positions of the workpiece and the electrode and of a magnitude determined by whether the workpiece and the electrode are being advanced or retracted relative to each other, a gap reference signal voltage corresponding in magnitude to the voltage across a predetermined gap between the electrode and the workpiece; a gap signal voltage corresponding to the relative positions of the electrode and the workpiece, and an oscillating signal voltage, circuit means communicating with each of the signal voltage sources and adapted to develop an operating voltage representative of the combined signal voltages, the operating voltage being utilized by the fluid control means to control the operation of the fluid pressure operated means so that the fluid pressure operated means is caused by the oscillating signal voltage to vibrate continuously while adjusting the relative positions of the workpiece and the electrode so as to maintain the predetermined gap therebetween, and means altering the velocity signal voltage in one direction of relative movement between the electrode and workpiece so that the fluid pressure operated means alters the relative positions of the electrode and the workpiece at fast and slow velocity rates in accordance with the variations in the velocity signal voltage when the electrode and the workpiece are respectively being retracted or advanced.

13. In electric discharge machining apparatus for removing material from an electrically conductive workpiece, the combination of an electrode; means causing intermittent electric discharges across a gap between the electrode and the workpiece; fluid pressure operated means varying the relative positions of the electrode and the workpiece; and control means for the fluid pressure operated means including fluid control means controlling the fluid pressure operated means, and plural sources of signal voltages producing a velocity signal voltage corresponding to the velocity of movement of the fluid pressure operated means, a gap reference signal voltage corresponding in magnitude to the voltage across a predetermined gap between the electrode and the workpiece, a gap signal voltage corresponding to the relative positions of the electrode and the workpiece, and an oscillating signal voltage, limiting means coacting with the velocity signal source to limit the velocity signal voltage in one direction of relative movement between the electrode and the workpiece, and circuit means communicating with each of the signal voltage sources and adapted to develop an operating voltage representative of the combined signal voltages, the operating voltage being utilized by the fluid control means to control the operation of the fluid pressure operated means so that the fluid pressure operated means is caused by the oscillating signal voltage to vibrate continuously while adjusting the relative positions of the workpiece and the electrode so as to maintain the predetermined gap therebetween and so that the fluid pressure operated means alters the relative positions of the electrode and the workpiece at different velocity rates in accordance with variations in the velocity signal voltage thereby separating the electrode and the workpiece at a faster rate than when brought closer together.

14. In electric discharge machining apparatus for removing material from an electrically conductive workpiece, the combination of an electrode; means causing intermittent electric discharges across a gap between the electrode and the workpiece; fluid pressure operated piston means varying the relative positions of the electrode and the workpiece; and control means for the fluid pressure operated means including a source of fluid pressure, control valve means for causing fluid pressure to be delivered from the source to the fluid pressure operated means so as to alter the relative positions of the electrode and the workpiece, plural sources of signal voltages so arranged as to produce a gap reference signal voltage corresponding in magnitude to the voltage across a predetermined gap between the electrode and the workpiece and a gap signal voltage corresponding to the true voltage appearing across the gap and accordingly to the relative positions of the electrode and the workpiece, and summing circuit means communicating with each of the signal voltage sources and also the control valve means, the summing circuit being adapted to develop an operating voltage representative of the combined signal voltages for controlling the control valve means so as to cause the fluid pressure operated means to adjust the relative positions of the electrode and the workpiece thereby maintaining the predetermined gap therebetween.

15. In electric discharge machining apparatus for removing material from an electrically conductive workpiece, the combination of an electrode; means causing intermittent electric discharges across a gap between the electrode and the workpiece; fluid pressure operated means varying the relative positions of the electrode and the workpiece; and control means for the fluid pressure operated means including a source of fluid pressure, control valve means for causing fluid pressure to be delivered from the source to the fluid pressure operated means so as to alter the relative positions of the electrode and the workpiece, plural sources of signal voltages so arranged as to produce a velocity signal voltage corresponding both to the velocity at which and to the direction in which the fluid pressure operated means varies the relative positions between the electrode and the workpiece, a gap reference signal voltage corresponding in magnitude to the voltage across a predetermined gap between the electrode and the workpiece, and a gap signal voltage corresponding to the relative positions of the electrode and the workpiece, summing circuit means communicating with each of the signal voltage sources and also the control valve means, the summing circuit being adapted to develop an operating voltage representative of the combined signal voltages for controlling the control valve means so as to cause the fluid pressure operated means to adjust the relative positions of the electrode and the workpiece thereby maintaining a predetermined gap therebetween, and means altering the velocity signal in one direction of relative movement between the electrode and the workpiece so that the fluid pressure operated means causes the velocity of relative movement between the electrode and the workpiece to be faster when the electrode and the workpiece are separated than when brought closer together.

16. In electric discharge machining apparatus for removing material from an electrically conductive workpiece, the combination of an electrode; means causing intermeittent electric discharges across a gap between the electrode and the workpiece; fluid pressure operated means varying the relative positions of the electrode and the workpiece, and control means for the fluid pressure operated means including a source of fluid pressure, control valve means for causing fluid pressure to be delivered from the source to the fluid pressure operated means so as to alter the relative positions of the electrode and the workpiece, plurality sources of signal voltages so arranged as to produce a velocity signal voltage corresponding both to the velocity at which and to the direction in which the fluid pressure operated means varies the relative positions between the electrode and the workpiece, a gap reference signal voltage corresponding in magnitude to the voltage across a predetermined gap between the electrode and the workpiece, a gap signal voltage corresponding to the relative positions of the electrode and the workpiece, and an oscillating signal voltage, summing circuit means communicating with each of the signal voltage sources and also the control valve means, the summing circuit means being adapted to develop an operating voltage equal to the algebraic sum of the combined signal voltages for controlling the control valve means so as to cause the fluid pressure operated means to cause vibrating relative movement between the electrode and the workpiece continuously in accordance with the oscillating signal voltage while adjusting the relative positions of the electrode and the workpiece thereby maintaining the predetermined gap therebetween, and means altering the velocity signal voltage so as to cause the fluid pressure operated means to alter the relative movement between the electrode and the workpiece in accordance with the variations in the velocity signal voltage thereby separating the electrode and workpiece at a faster rate than when brought together.

17. In electric discharge machining apparatus for removing material from an electrically conductive workpiece, the combination of an electrode; means causing intermittent electric discharges across a gap between the electrode and the workpiece; fluid pressure operated servo means for retracting and advancing the electrode relative to the workpiece; and control means for the fluid pressure operated servo means including a source of fluid pressure, control valve means for causing fluid pressure to be delivered from the source to the servo means so as to advance and retract the electrode, plural sources of signal voltages so arranged as to produce velocity signal voltages corresponding respectively to advancing and retracting movements of the electrode by the servo means, a gap reference signal voltage corresponding in magnitude to the voltage across a predetermined gap between the electrode and the workpiece, a gap signal voltage corresponding to the relative positions of the electrode and the workpiece, and an oscillating signal voltage, summing circuit means communicating with each of the signal voltage sources and the control valve means, the summing circuit means being adapted to develop an operating voltage equal to the algebraic sum of the combined signal voltages for controlling the control valve means so as to cause the servo means to vibrate the electrode continuously in accordance with the oscillating signal voltage while adjusting the relative positions of the electrode and the workpiece thereby maintaining the predetermined gap therebetween and so as to cause the servo means to retract and advance the electrode, and limiting means coacting with the velocity signal source to limit the velocity signal voltage during retracting movement of the electrode so that the servo means is caused by the control valve means to retract the electrode at a faster velocity rate than during advance.

18. In electric discharge machining apparatus for removing material from an electrically conductive workpiece, the combination of an electrode, power supply means causing intermittent electric discharges across a gap between the electrode and the workpiece, the power supply means including resistance and capacitance means and a source of electrical energy together regulating the electric discharges so as to be of a predetermined magnitude and duration, power operated means varying the relative positions of the electrode and the workpiece, and control means for the power operated means including gap voltage sensing means developing a gap signal voltage corresponding to the relative positions of the electrode and the workpiece, velocity sensing means developing a velocity signal voltage corresponding both to the velocity at which and to the direction in which the power operated means varies the relative positions of the electrode and the workpiece, and means altering the velocity signal voltage in one direction of relative movement between the electrode and the workpiece, the control means being so arranged as to correlate the signal voltages and cause the power operated means to adjust the relative positions of the electrode and the workpiece so as to maintain a predetermined gap therebetween and also to alter the relative positions of the electrode and the workpiece at fast and slow velocity rates in accordance with the variation in the velocity signal voltage when the electrode and the workpiece are respectively being separated or brought closer together.

19. In electric discharge machining apparatus for removing material from an electrically conductive workpiece, the combination of an electrode; power supply means causing intermittent electrical discharges across a gap between the electrode and the workpiece; the power supply means including a source of direct current, capacitance means for storing a selected quantity of electrical energy, a charging circuit including the capacitance means, a resistance, and an inductance each in series with the capacitance means and the source of direct current, and a discharging circuit including the capacitance means and the gap in series therewith; power operated means varying the relative positions of the electrode and the workpiece; and control means for the power operated means comprising a source of fluid pressure, a servo valve maneuverable so as to connect the source of fluid pressure to the power means and cause the power means to alter the relative positions of the electrode and the workpiece, a force motor for maneuvering the servo valve, plural sources of signal voltages so arranged as to produce a gap reference signal voltage corresponding in magnitude to the voltage across a predetermined gap between the electrode and the workpiece and a gap signal voltage corresponding to the relative positions of the electrode and workpiece, the plural sources of signal voltages also including a velocity transducer coacting with the power means so as to be maneuverable thereby and develop a velocity signal voltage having a polarity corresponding to the direction of relative movement between the electrode and the workpiece, means limiting the velocity signal voltage when of a selected polarity, and summing circuit means having the input thereof connected to each of the plural sources of signal voltages and the output thereof connected to the force motor, the summing circuit means being adapted to develop an operating voltage from combined signal voltages for controlling the force motor so as to cause the power means to adjust the relative positions of the electrode and the workpiece thereby maintaining the predetermined gap therebetween determined by the gap reference signal voltage and so that the power means causes the velocity of movement between the electrode and the workpiece as determined by the velocity transducer produced signal voltage to be fast and slow when the electrode and the workpiece are respectively separated and brought closer together.

20. In electric discharge machining apparatus for removing material from an electrically conductive workpiece, the combination of an electrode; power supply means causing intermittent electrical discharges across a gap between the electrode and the workpiece; the power supply means including a source of direct current, capacitance means for storing a selected quantity of electrical energy, a charging circuit including the capacitance means, a resistance, and an inductance each in series with the capacitance means and the source of direct current, and a discharging circuit including the capacitance means and the gap in series therewith, fluid pressure operated means varying the relative positions of the electrode and the workpiece; and control means for the fluid pressure operated means comprising a source of fluid pressure, a servo valve maneuverable so as to connect the source of fluid pressure to the fluid pressure operated means and cause the fluid pressure operated means to alter the direction of relative movement between the electrode and the workpiece, a force motor for maneuvering the servo valve, plural sources of signal voltages so arranged as to produce a gap reference signal voltage corresponding in magnitude to the voltage across a predetermined gap between the electrode and the workpiece, a gap signal voltage corresponding to the relative positions of the electrode and workpiece, and an oscillating signal voltage, the plural sources of signal voltages also including a velocity transducer coacting with the electrode so as to be maneuverable therewith and developing a velocity signal voltage having a polarity corresponding to the direction of relative movement between the electrode and the workpiece, means limiting the velocity signal voltage when of a selected polarity, and summing circuit means having the input thereof connected to each of the plural sources of signal voltages and the output thereof connected to the force motor, the summing circuit means being adapted to develop an operating voltage from the combined signal voltages for controlling the force motor so as to cause the fluid pressure operated means to cause vibrating relative movement between the electrode and the workpiece continuously in accordance with the oscillating signal voltage while adjusting the relative positions of the electrode and the workpiece thereby maintaining the predetermined gap therebetween determined by the gap reference signal voltage and so that the fluid pressure operated means causes the velocity of movement between the electrode and the workpiece as determined by the velocity transducer produced signal voltages to be fast and slow when the electrode and the workpiece are respectively separated and brought closer together.

21. In electric discharge machining apparatus for removing material from an electrically conductive workpiece, the combination of an electrode; means causing intermittent electric discharges across a gap between the electrode and the workpiece; power means varying the relative positions of the electrode and the workpiece; and control means for the power means including a source producing a velocity signal voltage corresponding both

17 to the velocity at which and to the direction in which the power means varies the relative positions of the electrode and the workpiece for controlling the operation of the power means, and means coacting with the velocity signal source so as to alter the velocity signal voltage during one direction of relative movement between the electrode and the workpiece thereby causing the velocity of retracting relative movement between the electrode and the workpiece to be faster than the velocity of advancing relative movement.

22. In electric discharge machining apparatus for removing material from an electrically conductive workpiece, the combination of an electrode; means causing intermittent electric discharges across a gap between the electrode and the workpiece; power means for retracting and advancing the electrode relative to the workpiece; and control means for the power means including a source producing a velocity signal voltage corresponding respectively to advancing and retracting movements of the electrode by the power means for controlling the advancing and retracting movements of the electrode, and limiting means coacting with the velocity signal source to limit the velocity signal voltage during retracting movement of the electrode so that the power means is caused by the control means to retract the electrode at a faster velocity rate than during advance.

23. In electric discharge machining apparatus for removing material from an electrically conductive workpiece, the combination of an electrode; means causing intermittent electric discharges across a gap between the electrode and the workpiece; power operated means varying the relative positions of the electrode and the workpiece; and control means for the power operated means including a velocity transducer coacting with the power operated means so as to develop a velocity signal voltage having a polarity corresponding to the direction in which and at a magnitude corresponding to the velocity at which the power operated means varies the relative position of the electrode and the workpiece, and means altering the velocity signal voltage when of a selected polarity so that the power operated means causes the velocity of relative separating movement between the electrode and the workpiece to be faster than relative advancing movement as determined by the velocity transducer produced signal voltages.

24. In electric discharge machining apparatus, the combination of electrically conductive cutting tool and workpiece electrodes, means causing intermittent electric discharges across a gap between the electrodes so as to remove material from the workpiece electrode, a servomotor for maneuvering the electrodes relative to each other, the servomotor including a cylinder and a piston slidable therein, control means for the servomotor including a source of fluid pressure, a control valve for causing fluid pressure to be delivered from the source selectively to opposite ends of the cylinder so as to move the piston in a corresponding direction, and a bypass valve communicating with opposite ends of the cylinder, the bypass valve being operative to bypass a portion of the fluid pressure delivered to a selected end of the cylinder so as to alter the responsiveness of piston movement to fluid pressure actuation.

25. In electric discharge machining apparatus, the combination of electrically conductive cutting tool and workpiece electrodes, means causing intermittent electric discharges across a gap between the electrodes so as to remove material from the workpiece electrode, a servomotor for maneuvering the electrodes relative to each other, the servomotor having a cylinder provided with supply lines, one communicating with each end thereof and a piston slidable in the cylinder, the piston being operatively connected to one of the electrodes, control means for the servomotor including a source of fluid pressure, a control valve for causing fluid pressure to be delivered from the source to one of the supply lines so as to cause the piston to be moved in a corresponding direction and carry therewith said one electrode, a force motor for controlling the operation of the control valve, and a bypass valve communicating with each of the supply lines to the servo cylinder, the bypass valve being adjustable so as to vary the circulation of fluid pressure in the system and alter the responsiveness of the servomotor to the fluid pressure.

26. In electrical stock removal apparatus, the combination of conductive cutting tool and workpiece electrodes spaced apart so as to form a gap therebetween, means supplying voltage to the gap so as to produce time spaced electric discharges across the gap and thereby effect stock removal from the workpiece electrode, means maneuvering the electrodes relative to each other so as to maintain a predetermined gap therebetween, and control means for the maneuvering means including a source of reference voltage corresponding in magnitude to the predetermined gap, means developing a gap signal voltage corresponding to and that varies directly with the true voltage appearing across the gap, and passive electrical circuit means having the input thereof connected both to the source of reference voltage and to the gap signal voltage developing means for comparing the reference and gap signal voltages so as to develop a control signal corresponding directly to variations in the gap signal voltage relative to the reference voltage, the electrical circuit means having the output thereof electrically connected to the maneuvering means for operating the maneuvering means in accordance with the control signal thereby causing the predetermined gap to be maintained.

27. In electrical stock removal apparatus, the combination of conductive cutting tool and workpiece electrodes spaced apart so as to form a gap therebetween, means supplying voltage to the gap so as to produce time spaced electric discharges across the gap and thereby effect stock removal from the workpiece electrode, means maneuvering the electrodes relative to each other so as to maintain a predetermined gap therebetween, and control means for the maneuvering means including a source of reference voltage corresponding in magnitude to the predetermined gap and a passive summing circuit having plural inputs, one of the inputs being connected to the reference voltage source and another of the inputs being connected across the gap so as to have applied thereto a gap voltage corresponding to and that varies directly with the true voltage appearing across the gap and accordingly corresponds to gap spacing, the summing circuit having the output thereof electrically connected to the maneuvering means, the summing circuit being operative to compare the gap and reference voltages and develop output control signals corresponding directly to variations in the gap voltage relative to the reference voltage so as to cause the maneuvering means to maintain the predetermined gap in accordance with the control signal.

References Cited in the file of this patent

UNITED STATES PATENTS

| | | |
|---|---|---|
| 1,953,454 | Wollaeger | Apr. 3, 1934 |
| 2,475,701 | Eaton | July 12, 1949 |
| 2,486,982 | Rossman | Nov. 1, 1949 |
| 2,783,411 | Matulaitis | Feb. 26, 1957 |
| 2,804,575 | Matulaitis | Aug. 27, 1957 |
| 2,839,707 | Spearing | June 17, 1958 |

UNITED STATES PATENT OFFICE
CERTIFICATE OF CORRECTION

Patent No. 3,059,150            October 16, 1962

Robert B. Colten et al.

It is hereby certified that error appears in the above numbered patent requiring correction and that the said Letters Patent should read as corrected below.

Column 2, line 61, for "industances" read -- inductances --; column 4, line 50, for "undestood" read -- understood --; column 6, line 3, for "shoull" read -- should --; line 48, for "is" read -- in --; column 7, line 61, for "potor" read -- motor --; column 14, line 32, for "plurality" read -- plural --; column 15, line 43, for "variation" read -- variations --.

Signed and sealed this 26th day of March 1963.

(SEAL)
Attest:

ESTON G. JOHNSON
Attesting Officer

DAVID L. LADD
Commissioner of Patents